United States Patent Office 3,277,008
Patented Oct. 4, 1966

3,277,008
SURFACE CLEANING METHOD AND
COMPOSITION
Allyn H. Heit, Mount Holly, N.J., assignor to Pfaudler
Permutit Inc., Birmingham, N.J., a corporation of New
York
No Drawing. Filed Apr. 20, 1962, Ser. No. 188,943
4 Claims. (Cl. 252—82)

This invention relates to a method and composition for cleaning metal surfaces such as the metal surfaces of glass coated metal forms, and more particularly to a method and composition for removing scale from the jacket side of glass-lined jacketed equipment.

Glass-lined equipment is used in many applications which require that a jacket be utilized for temperature control purposes. When water or other fluid is circulated through such jackets to effect cooling or heating of the contents of the equipment, scale tends to form on the interior metal surfaces of the jacket which are in contact with the water or other fluid. The scale is a deposit of the products of corrosion and of the mineral and organic solids content of the water or other fluid used. Scale formation is particularly troublesome where raw untreated water is used. The scale reduces the efficiency of heat control, impedes coolant circulation, and must be removed periodically by circulating a descaling agent through the jacket.

When uninhibited mineral acids and many organic acids are employed to descale such internal surfaces, nascent hydrogen is formed by the action of the acid on the metal, and diffuses into and through the metal causing the glass lining to separate from the metal. The effect is known as spallation, fish-scaling, or popping. Once the spallation has taken place the usefulness of the glass-lined equipment to withstand acidic liquors and to provide a rust-free container under neutral and alkaline conditions is ended.

Accordingly, it is an object of this invention to provide a method and composition for descaling metal surfaces and particularly the internal jacket surfaces of glass-lined jacketed equipment, while protecting the integrity of the glass lining.

It is a further object of this invention to provide descaling compositions that may be used in cleaning glass coated, metal surfaces.

Other objects will be apparent to those skilled in the art from reading the following description.

The objects of the invention are achieved by circulating through the jacket to be descaled, a solution, and particularly an aqueous solution, of an organic acid having an ethylenic bond in its structure, preferably in a position alpha-beta with respect to a carboxyl group. I have found that aqueous solutions of maleic, acrylic, methacrylic, cinnamic, itaconic and other carboxylic acids which feature in their structure an ethylenic bond between two carbon atoms may be kept in contact with the metal side of glass-lined equipment for indefinite periods of time at elevated temperatures with no hazard to the integrity of the glass to metal bond. The acids of my invention may be used alone or with inhibitors or in combination with other cleaning agents. When used with other acids that normally cause spallation, the acids of my invention inhibit such spallation.

I have determined the degree of safety of various formulations and the tolerance time of various acids and acidic combinations by means of a simple apparatus. The apparatus consists of a glass cylinder open at both ends with a tubulated vent in the middle. A glass-lined steel disc 3⅝ inches in diameter, 1/16 inch thick, and having a coating of glass 0.030 inch thick was mounted against one end of the glass cylinder such that the bare metal side was exposed to the contents of the cylinder. The other end of the cylinder was similarly closed. Metal assembly plates bored to permit free visual inspection of the glass lining and the insertion of four threaded tie-rods were butted against the discs. Neoprene ring gaskets were placed between the glass cylinder and the test disc, and between the test disc and the assembly plates. The whole assembly was then sealed by tightening nuts placed on the four tie-rods.

A given liquor was tested for its suitability by filling the twin disc apparatus through its vent. About 750 milliliters of liquor was required. The assembly was then immersed in a water bath thermostatically controlled at a predetermined temperature, and examined periodically. The results of the tests using various acids and temperatures are shown in Table I. Percentages shown in Table I and throughout the specification are percentages by weight of the total composition or solution.

Table I

| Example | Acid | Percent by wt. $H_2O$ Soln. | ° C. Temp. | Time to Spallation | Time Under Observation, days |
|---|---|---|---|---|---|
| 1 | Maleic | 10 | 23 | Negative | 90 |
| 2 | Itaconic | 10 | 23 | ---do--- | 90 |
| 3 | Methacrylic | 10 | 60 | ---do--- | 30 |
| 4 | Cinnamic | 10 | 23 | ---do--- | 30 |
| 5 | Furoic | 10 | 25 | ---do--- | 30 |
| 6 | Formic | 10 | 60 | 3 weeks | |
| 7 | Acetic | 10 | 60 | ---do--- | |
| 8 | Propionic | 10 | 60 | ---do--- | |
| 9 | Citric | 10 | 23 | 10 days | |
| 10 | Succinic | 10 | 60 | 5 days | |
| 11 | Sulfamic | 10 | 23 | 3½ days | |
| 12 | Sulfuric | 10 | 23 | 7¼ hrs | |

Examples 1–5 above are effective in practicing my invention. Examples 6–10 above are not effective since they result in spallation in a short period of time. Some acids appear to be safe for a period longer than the usual time required for descaling treatment, but spallation may take place after the completion of treatment, perhaps because of the persistence of the hydrogen dissolved in the metal. For example, 10% formic acid did not produce spallation during exposure to the glass-lined test disc equipment for a period of three weeks at 60–70° C. However, several days after the replacement of the formic acid with water, the glass lining underwent severe spallation. Acetic, propionic, succinic and citric acids have similar effects and disadvantages. Sulfuric, hydrochloric and sulfamic acids are particularly undesirable for this reason.

The acids shown in the table were used at the preferred strength of 10%. However, the unsaturated carboxylic acids of the present invention are effective in descaling solutions in concentrations ranging from about 1% to saturation, and preferably from about 1 to 20%.

From the economic standpoint, maleic acid is preferred among the effective acids of the present invention by reason of its low cost, abundant supply and low equivalent weight. Maleic acid, however, is somewhat corrosive to the type of mild steel which usually constitutes the metal backing of glass-lined equipment. Maleic acid will attack such steel at a rate of 1100 mils of metal loss per year (m.p.y.) based upon a 24 hour attack at 60 to 70° C. Therefore, the use of an inhibitor is desirable to repress the rate of corrosion. A number of proprietary inhibitors of the organic amine type and other types have been found which serve the purpose, for example, O'B Hibit and Rodine 140 are suitable. O'B Hibit is a mixture of sodium borate and dibasic sodium phosphate serving as a solid diluent and having present as the active corrosion inhibitor a substantial proportion of 1,3-dibutyl thiourea. Small amounts of surface active agent are present. Rodine 140 contains as the corrosion inhibitor triphenyl sulfonium chloride. The use of this material as a corrosion inhibitor is disclosed in U.S. Patent No. 2,941,949. Other corrosion inhibitors may be employed as will be apparent to those skilled in the corrosion inhibition art, using agents known to be suitable for this purpose. Among the corrosion inhibitors which may be employed are: 2,3-xylidine, ortho-toluidine, para-toluidine, diethylaniline, methyl aniline, dimethylaniline, amylamine triamylamine, tetramethylammonium chloride, etc. The corrosion inhibitor is used in amount up to about 2% by weight of aqueous or other solution, the ethylenically unsaturated carboxylic acid being present in amounts of from about 1% by weight up to amounts necessary to form saturated solutions.

The acids of my invention may be used with other acids and will inhibit the spallation normally caused by the other acids. For example, aqueous solutions of sulfamic acid and proprietary inhibitors of the organic amine type are unsuitable for cleaning jacketed, glass-lined equipment. When such solutions are used for descaling, heavy spallation takes place in a matter of 5 or 6 days contact at 60 to 70° C.

I have found that an economical solid descaling composition in accordance with the present invention may be prepared comprising a cleaning agent, such as sulfamic acid or sodium bisulfate, in combination with a corrosion inhibitor and an ethylenically unsaturated carboxylic acid of the invention. The ethylenically unsaturated carboxylic acid provides protection to the integrity of the glass lining even when used with the cleaning agents. The cleaning agents may constitute preferably from about 55 to 70% by weight of the composition. The ethylenically unsaturated carboxylic acid may constitute preferably from about 25 to 40% by weight of the composition, and the inhibitor may constitute up to about 5% by weight of the composition. Preferred compositions of this type are:

(I)

| | Percent |
|---|---|
| Sulfamic acid | 65 |
| Maleic anhydride | 30 |
| O'B Hibit | 5 |

(II)

| | |
|---|---|
| Sodium bisulfate | 69.5 |
| Maleic anhydride | 26.0 |
| O'B Hibit | 4.5 |

(III)

| | |
|---|---|
| Sulfamic acid | 59.3 |
| Itaconic acid | 36.2 |
| O'B Hibit | 4.5 |

(IV)

| | |
|---|---|
| Sodium bisulfate | 61.1 |
| Itaconic acid | 34.4 |
| O'B Hibit | 4.5 |

(V)

| | |
|---|---|
| Sulfamic acid | 59.6 |
| Maleic acid | 35.4 |
| O'B Hibit | 5.0 |

Such compositions are economical and effective solvents for iron oxide, calcium carbonate, calcium phosphates, magnesium carbonate, magnesium phosphates, and the like, which are frequently present in the scales found on metallic surfaces. The storage of a glass-lined metallic disc at room temperature for a period of 3½ months in contact with aqueous solutions of each of the above compositions shows no evidence of injury to the glass. Tests results of typical descalent compositions with and without an ethylenically unsaturated carboxylic acid in accordance with the present invention are set out in Table II below:

Table II

| Composition | Percent by wt. H$_2$O Soln. | Temp., °C. | Time to Spallation | Time Under Observation, days |
|---|---|---|---|---|
| A. Sulfamic acid 95%, O'B Hibit 5%. | 10 | 60 | 5½ days | |
| B. Sulfamic Acid 65%, O'B Hibit 5%, Maleic Acid 30%. | 10 | 60 | Negative | 30 |
| C. Sulfamic Acid 65%, O'B Hibit 5%, Maleic Acid 30%. | 10 | 23 | do | 105 |

The preferred descalent compositions of the invention are mixtures of solids which can be made up to a preferred strength by addition of water. Thus the consumer can store the formulation in the solid state in ordinary fiber drums, and eliminate the spillage and breakage incident to the storage of glass carboys. The maleic acid portion in the dry mixture may be maleic anhydride, which hydrolyzes readily and completely to maleic acid in the preparation of the aqueous solution.

The preferred descaling solutions of the invention have a total solids content of between about 10% and 20% by weight. However, effective protection and cleaning action have been obtained from solutions having a solids content between 5% and 25% by weight. The stated solids content represents availability of 1.25 to 1.4 ethylenically unsaturated carboxylic acid equivalents per 1000 grams of solution. Although only half of this concentration may be consumed in descaling, particularly if the vessel does not have a heavily scaled internal surface, the optimum rates of dissolution of the scale are achieved at the higher concentrations.

The descaling solutions may contain a cleaning agent in amounts from 1% up to amounts that form saturated solutions, an ethylenically unsaturated carboxylic acid in amounts from 1% up to amounts that form saturated solutions, and up to 2% of a corrosion inhibitor. However, the descaling solutions using the compositions preferably contain from about 5 to 10% of a cleaning agent, about 2 to 5% of the ethylenically unsaturated carboxylic acid, and up to 0.6% of inhibitor.

The precise duration of the descaling operation depends on the thickness and chemical composition of the deposits. However, 6 hours can be considered as a minimum circulation time.

In the event that the scale is constituted primarily of gypsum (calcium sulfate) or siliceous matter (silica, silicates) the composition is best applied as a second stage of treatment. An initial stage of treatment should be used, in such cases, consisting of the circulation for at least 2 hours of a 3 to 5% (preferably 3.5%) sodium carbonate, or sodium hydroxide, aqueous solution, so that the scale materials may be converted to the carbonates or hydroxides.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of descaling the internal metal surfaces of the jacket of glass-lined jacketed equipment while preventing spallation of the glass-lining which comprises circulating through the jacket an aqueous acidic solution containing from about 2 to 20 percent by weight of an alpha-beta ethylenically unsaturated, water-soluble carboxylic acid, said carboxylic acid being of such nature as to react with insoluble phosphates, carbonates, and hydroxides to produce water-soluble compounds.

2. A method according to claim 1 wherein the ethylenically unsaturated carboxylic acid comprises at least one member selected from the class consisting of maleic acid, acrylic acid, methacrylic acid, cinnamic acid, itaconic acid and furoic acid.

3. A composition suitable for use with water to form an aqueous solution for descaling the internal metal surfaces of the jacket of glass-lined jacketed equipment comprising from about 55 to 70 percent by weight of a cleaning agent selected from the class consisting of acetic, propionic, succinic, citric, sulfuric, hydrochloric and sulfamic acids and sodium bisulfate, from about 25 to 40 percent by weight of an alpha-beta ethylenically unsaturated, water-soluble carboxylic acid, and up to about 5 percent by weight of an acid corrosion inhibitor selected from the class consisting of 1,3-dibutyl thiourea, triphenyl sulfonium chloride, 2,3-xylidine, ortho-toluidine, para-toluidine, diethylaniline, methylaniline, dimethylaniline, amylamine, triamylamine, and tetramethylammonium chloride.

4. A composition as defined in claim 3 wherein said ethylenically unsaturated carboxylic acid comprises at least one member selected from the class consisting of maleic acid, acrylic acid, methacrylic acid, itaconic acid, cinnamic acid and furoic acid.

References Cited by the Examiner
UNITED STATES PATENTS

| | | | |
|---|---|---|---|
| 2,419,076 | 4/1947 | Horsley | 134—27 |
| 2,425,320 | 8/1947 | Hill | 252—149 |
| 2,796,353 | 6/1957 | Dieman et al. | 106—14 |
| 2,847,384 | 8/1958 | Conklin et al. | 252—82 |
| 2,995,477 | 8/1961 | Florence | 252—82 XR |
| 2,996,414 | 8/1961 | Cardey et al. | 134—27 |
| 3,003,898 | 10/1961 | Reich | 252—82 XR |
| 3,041,285 | 6/1962 | Newman | 252—149 |

LEON D. ROSDOL, *Primary Examiner.*

JULIUS GREENWALD, *Examiner.*

J. D. WELSH, *Assistant Examiner.*